2,350,196

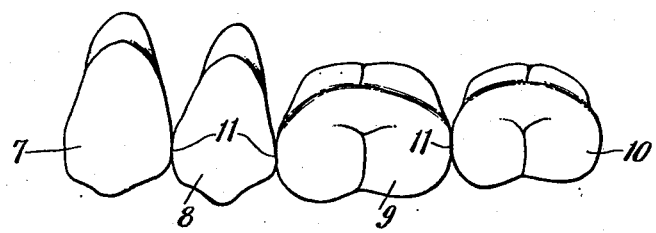
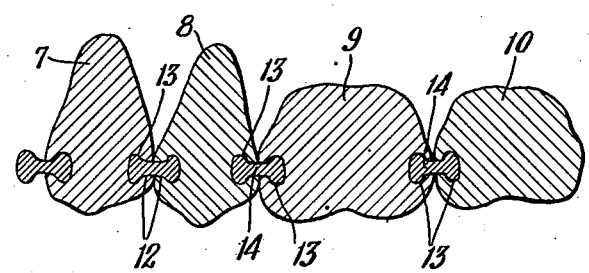
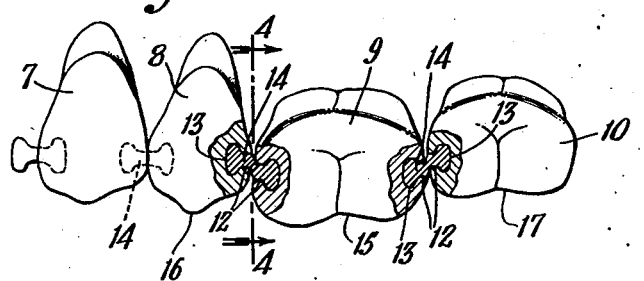
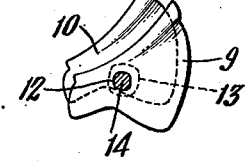
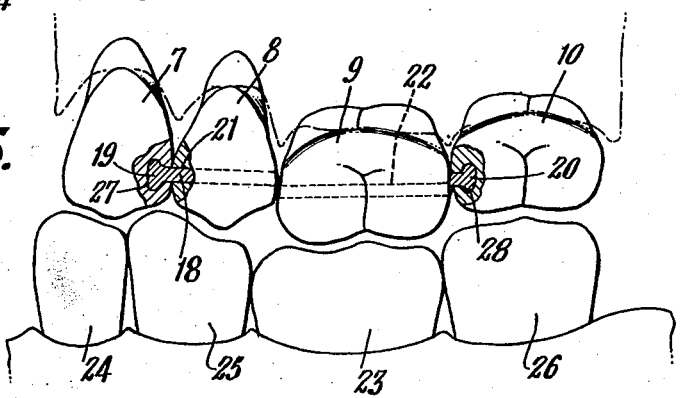
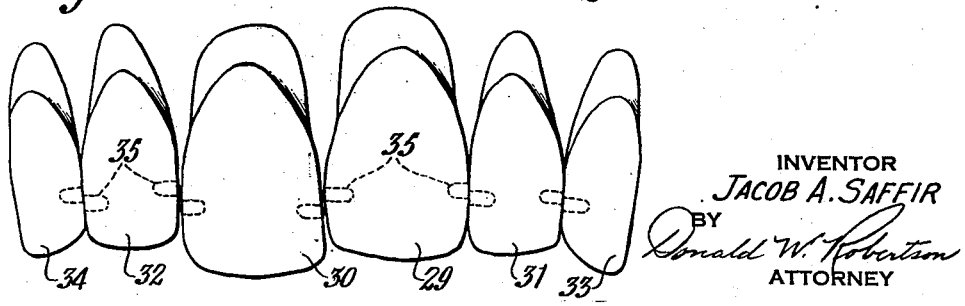
INVENTOR
JACOB A. SAFFIR
BY
ATTORNEY Patented May 30, 1944

UNITED STATES PATENT OFFICE 2,350,196

ARTIFICIAL TEETH

Jacob A. Saffir, Chicago, Ill., assignor to The Dentists' Supply Company of New York, New York, N. Y., a corporation of New York Application October 27, 1942, Serial No. 463,475

1 Claim. (Cl. 32—5)

The invention relates to artificial teeth, and more particularly to tooth blocks comprising a plurality of teeth secured together in a form suitable for incorporation in a denture.

Very early in dentistry, the advantages of producing teeth in blocks or sections of three and four or more were recognized, and many were produced in this manner. But the great handicap that was occasioned by the lack of motility of any individual tooth in the block of teeth placed definite limitations on the use of such blocks, and they have not been found to meet the needs of modern dentistry.

Similarly, attempts to wax teeth together in blocks have failed because the slightest pressure caused the teeth to fall apart. Also, in attempting to fuse a block of waxed teeth to the base plate, the heat causes the block to distort or the teeth to fall apart.

It has also been suggested that teeth made of the acrylics or similar plastics can be made in a block because by plunging the teeth in hot water or applying much pressure, the block can be slightly bent, but this bending is only slight and in limited directions and the point where the bending occurs can not be controlled and may often occur directly at the center of a tooth where it is most undesirable. Also, under no condition, could a single tooth from such a group of acrylic teeth be moved occlusally or gingivally, nor, for example, could a single tooth be moved buccally or lingually. Furthermore, it is impossible with such a tooth block to create a space between two teeth without cutting them apart.

It is an object of my invention to provide a tooth block which avoids these disadvantages, and which permits ready adjustment of the relative positions of the teeth without cutting them apart and without the application of heat.

Another object of the invention is to provide a tooth block in which the teeth are held normally in proper mesiodistal, bucco-lingual, and occlusal-gingival relationship so that the group of teeth comprised in the block can be set quickly in its entirety for a normal case, yet which permits manipulation of any selected tooth or teeth to create such relative positioning of the teeth as may be required for a particular case, while maintaining the integrity of the tooth block.

Another object of this invention is to enable the dentist to set up teeth more correctly and avoid the confusion which often arises when the teeth get mixed after being taken off of the carding device. There are, in many mouths today, plates and bridges with the first and second bicuspids reversed and other such errors, much to the detriment of the wearer of the plate or bridge. Other objects and advantages of the invention will appear as the description proceeds.

In accordance with my invention, a group of adjacent teeth are secured together in normal alignment by flexible means such as an elastic resin. I have found that a vinyl resin such as a co-polymer of suitable vinyl esters is particularly desirable for this purpose, and provides an effective means for holding the teeth together closely and firmly, while allowing the arrangement of individual teeth to be adjusted occlusally, gingivally, mesially, distally, lingually, or buccally to meet usual or unusual conditions in the arrangement or form of the opposing teeth. The adjustment can be made with the application of slight pressure and without danger of causing the teeth to break apart. The use of plastics as the flexible or elastic element which holds the teeth together is especially advantageous in uniting teeth made of plastics, and when the block is constructed in the manner which I shall describe more fully in conjunction with the drawing, an extremely durable bond is provided between the teeth without limiting adjustment of the individual teeth during the denture-making process. An example of a plastic which is well suited to the formation of the flexible bonding element is a copolymer of vinyl chloride and vinyl acetate. I prefer to use a plastic of this type because it is odorless, tasteless, nontoxic, non-inflammable, non-shrinking, is very tough, and has water and chemical resistance, as well as the ability of becoming part of the final plate without any deleterious effects to the final plate or bridge. This latter is so because it has, usually, as good or better physical properties than the final base plate material or tooth material itself.

In the drawing,

Fig. 1 is a buccal view of a preferred embodiment of the invention as applied to a tooth block including four upper left posterior teeth; and Fig. 2 is a vertical cross sectional view of the teeth shown in Fig. 1.

Fig. 3 is a buccal view similar to Fig. 1, but showing the first molar moved occlusally in relation to the other teeth in the block. In this view the connections between the molars and between the first molar and the second bicuspid are shown in vertical section.

Fig. 4 is a view taken as indicated at 4—4 in Fig. 3 between the second bicuspid and the first molar, showing the first molar in end elevation (mesial surface) and illustrating the twisting and offsetting of the first molar in relation to the second molar.

Fig. 5 is a view similar to Fig. 3, illustrating a modified form of the invention, and showing the artificial teeth set against irregular natural teeth.

Fig. 6 is a labial view of another embodiment of the invention as applied to a tooth block including six upper anterior teeth.

With particular reference to Figs. 1 to 4, inclusive, I shall now describe a preferred embodiment of the invention as applied to a tooth block containing four upper left posterior teeth including a first bicuspid 7, second bicuspid 8, first molar 9 and second molar 10. The block may contain a lesser or greater number of teeth than has been selected for illustration. At or near the normal contact points 11 of adjacent teeth, where the mesial surface of one tooth lies adjacent the distal surface of the next tooth, there are provided recesses 12. These recesses may be formed during the moulding of the teeth or, if desired, may be drilled or otherwise formed after the tooth has been moulded. The teeth may be made of porcelain, or of a suitable plastic, or of such other materials as may be desired. In the case of teeth made of porcelain, I prefer that the recesses 12 be made with an undercut, as at 13. Flexible elements 14 are secured in the recesses or sockets 12 to unite each pair of adjacent teeth.

I have found that an elastic material such as a copolymer of the vinyl ester resins provides an effective means for holding the teeth together closely and firmly while permitting each tooth a substantial movement in relation to adjacent teeth and maintaining the integrity of the tooth block. As an example of a resin which is well suited to the formation of the flexible bonding elements 14, I have cited a co-polymer of vinyl chloride and vinyl acetate. In addition to possessing the advantageous characteristics previously enumerated, a plastic resin of this type provides an effective means for holding the teeth together closely and firmly while allowing the arrangement of individual teeth to be adjusted occlusally, gingivally, mesially, distally, lingually, and buccally to meet usual or unusual conditions in the arrangement or form of the opposing natural or artificial teeth, or, more particularly in the case of anterior teeth, to achieve such degree of irregularity as may be desired in order to produce lifelike arrangements. Moreover, the elastic properties of these resins permit the creation of spaces between the teeth, as may also be desired. Again, while the teeth may be separated slightly to create such spacing and easily held in that position, the teeth may be brought together again to their original normal spacing if, after preliminary trials, this seems to be desirable.

In Figs. 3 and 4, I have illustrated adjustment of the first molar 9 of the tooth block shown in Figs. 1 and 2, this molar having been pushed down lower than the second bicuspid 8 and second molar 10, bringing its occlusal plane 15 below the occlusal plane 16, 17 of the second bicuspid and second molar. The action of the elastic flexural elements 14 is shown in cross section in Fig. 3. Fig. 4 shows, further, the twisting of the first molar 9 with respect to the second molar 10, which is also permitted by the flexible elements 14.

In the embodiment illustrated in Fig. 5, the same four posterior teeth are shown, but in this form of the invention the teeth are united by a flexible element 18 which is anchored in the end teeth of the block and extends through each intermediate tooth. Thus, in this embodiment, the flexible element 18 is anchored at 19 in the first bicuspid 7 and at 20 in the second molar 10, extending through apertures 21 and 22 in the second bicuspid and first molar respectively. As in Fig. 3, the first molar 9 has been pushed down in order to bring its occlusal plane into the right relationship with the occlusal plane of the opposing lower natural molar 23 while retaining the bicuspids 7 and 8 and second molar 10 in correct relationship to the lower natural bicuspids 24 and 25 and lower natural second molar 26. When the teeth are made of porcelain, the recesses 27 and 28 in the teeth 7 and 10 preferably are undercut to provide a firm anchorage for the ends 19 and 20 of the flexible element 18.

From the preceding description of Fig. 5 it will be understood that the invention provides means for holding the artificial teeth together while permitting them to be set against natural teeth which present a very irregular occlusal plane, the flexibility of the securing means causing the artificial teeth to fall into perfect occlusal harmony with the natural teeth.

In Fig. 6 I have illustrated the application of the invention to a tooth block including six upper anterior teeth comprising the left and right centrals 29 and 30, laterals 31 and 32 and cuspids 33 and 34. The teeth comprised in the block are united by flexible elements 35 arranged at approximately the normal contact points of the teeth. The recesses for these inserts are not undercut in this embodiment in which the teeth are considered to be made of a plastic substance which forms a particularly effective bond with the plastic elements 35. For esthetic or other reasons, the right central 30 has been pushed down with relation to the other teeth, and the other teeth have been moved to positions other than those given them by the manufacturer in the original setup.

From the buccal side in the case of posteriors or from the labial side in the case of anteriors, the flexible elements which unite the teeth are hidden and practically invisible. The yieldable plastic or other materials used to make the joint should nevertheless be colored exactly the same shade as the adjacent portion of the tooth so that if in some places a very great distortion is needed, then because the color of the joint matches the color of the tooth, it will be substantially invisible.

The flexural elastic inserts may be moulded in situ by inserting them into the material from which the teeth are being constructed during the moulding thereof. Another method is to mould the teeth and provide at the proximal surfaces sockets to receive the flexible securing means, then place the soft pre-formed elastic material in the sockets, bringing the teeth together and allowing the elastic material to polymerize or otherwise cure to the desired tough flexible condition which will hold the teeth together.

In some cases it may be desirable to secure the teeth together by simply placing a small amount of the softened flexible polymer at the approximate position of contact between the teeth, and bring the teeth together, allowing this soft polymer to polymerize into the cured flexible state which will hold the teeth together securely and yet permit adjustment of the teeth when they are being set up. In this method, the sockets at the contact points of the teeth are not required. The terms and expressions which I have employed are used in a descriptive and not a limiting sense, and I have no intention of excluding such equivalents of the invention described, or of portions thereof, as fall within the purview of the claim.

I claim:

A number of artificial teeth, suitable for incorporation into a denture, attached to each other by elastic means at approximately the normal contact point of each tooth, said means holding them normally in the proper order of alignment for use in an average denture, and permitting a limited distortion of said alignment while the teeth remain attached to each other.

JACOB A. SAFFIR.